(12) United States Patent
Yamanakajima

(10) Patent No.: US 7,865,818 B2
(45) Date of Patent: Jan. 4, 2011

(54) FORM OUTPUT CONTROL APPARATUS, FORM OUTPUT CONTROL METHOD, AND COMPUTER READABLE PROGRAM

(75) Inventor: Kazunari Yamanakajima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 775 days.

(21) Appl. No.: 11/765,148

(22) Filed: Jun. 19, 2007

(65) Prior Publication Data
US 2007/0300146 A1    Dec. 27, 2007

(30) Foreign Application Priority Data
Jun. 23, 2006    (JP)    .............................. 2006-174380

(51) Int. Cl.
*G06F 17/00* (2006.01)
(52) U.S. Cl. ...................... 715/232; 715/204; 715/224; 715/230
(58) Field of Classification Search ................ 715/200, 715/201, 203, 204, 221, 224, 225, 226, 243, 715/251, 230, 232
See application file for complete search history.

(56) References Cited

U.S. PATENT DOCUMENTS

| | | | |
|---|---|---|---|
| 6,195,665 B1 * | 2/2001 | Jarett | 715/251 |
| 7,072,934 B2 * | 7/2006 | Helgeson et al. | 709/203 |
| 7,089,583 B2 * | 8/2006 | Mehra et al. | 726/3 |
| 7,143,344 B2 * | 11/2006 | Parker et al. | 715/236 |
| 7,630,986 B1 * | 12/2009 | Herz et al. | 1/1 |
| 2003/0145281 A1 * | 7/2003 | Thames et al. | 715/513 |
| 2003/0145282 A1 * | 7/2003 | Thomas et al. | 715/513 |
| 2003/0145310 A1 * | 7/2003 | Thames et al. | 717/123 |
| 2003/0163801 A1 * | 8/2003 | Thames et al. | 717/123 |
| 2003/0237046 A1 * | 12/2003 | Parker et al. | 715/513 |
| 2004/0186817 A1 * | 9/2004 | Thames et al. | 707/1 |
| 2004/0199516 A1 * | 10/2004 | Thames et al. | 707/100 |
| 2005/0055420 A1 * | 3/2005 | Wyler | 709/217 |

FOREIGN PATENT DOCUMENTS

JP    2006-024021 A    1/2006

* cited by examiner

*Primary Examiner*—Stephen S Hong
*Assistant Examiner*—Gregory J Vaughn
(74) *Attorney, Agent, or Firm*—Canon U.S.A., Inc. I.P. Division

(57) ABSTRACT

An apparatus places contents data of plural records of a database, in a template, which is represented by template data, and outputs the template data in which the contents data are inserted. The apparatus stores the template data defining a field area in which the contents data are placed, and sets replacement information for replacing annotation information to be placed in the template. When the contents represented by the contents data of the plural records are placed in the field area defined by the template data, the annotation information of each record is replaced with the replacement information.

15 Claims, 19 Drawing Sheets

FIG.4

| 401 NAME | 402 PRICE | 403 IMAGE | 404 ANNOTATION 1 (MERGE TARGET) | 405 ANNOTATION 2 (MERGE TARGET) |
|---|---|---|---|---|
| TV-X75 | 980,000 YEN | C:¥.....¥TV-X75.jpg | IMAGE IS AN INLAID COMPOSITE ONE | |
| ... | ... | ... | ... | ... |
| TV-X65 | 798,000 YEN | C:¥.....¥TV-X65.jpg | IMAGE IS AN INLAID COMPOSITE ONE | ABOUT 30% ENERGY SAVING |
| ... | ... | ... | ... | ... |
| TV-X55 | OPEN PRICE | C:¥.....¥TV-X55.jpg | IMAGE IS AN INLAID COMPOSITE ONE | ABOUT 40% ENERGY SAVING |

411, 412, 413

FIG.5
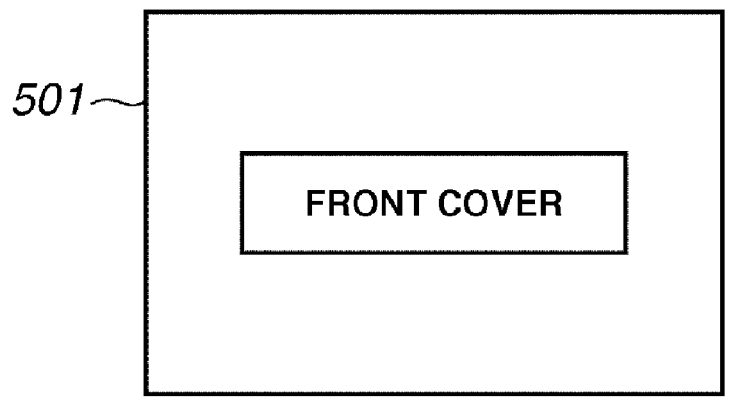
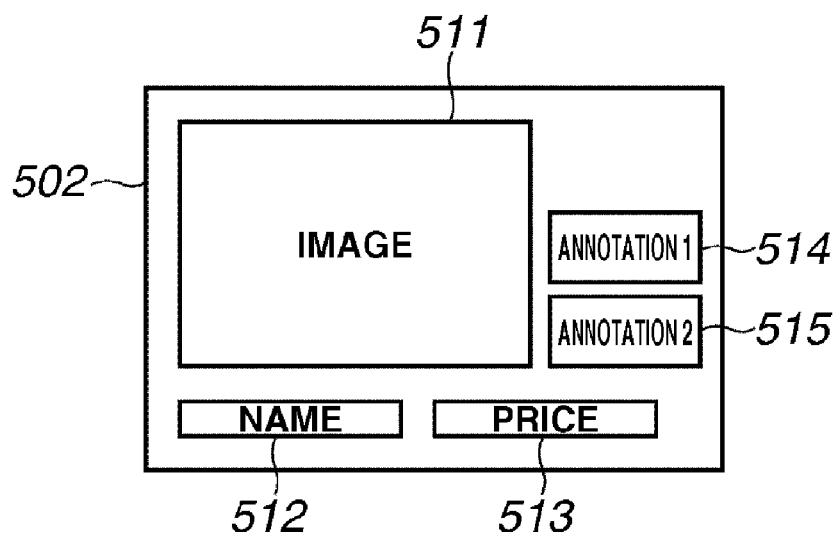
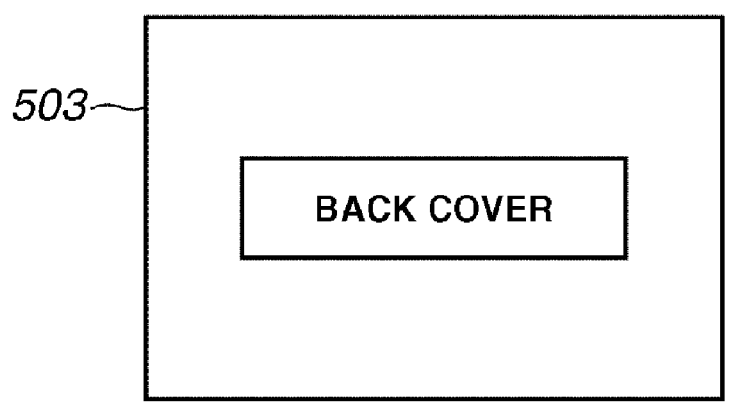

FIG.6
*601*
| FRONT COVER |
page 1
*602*
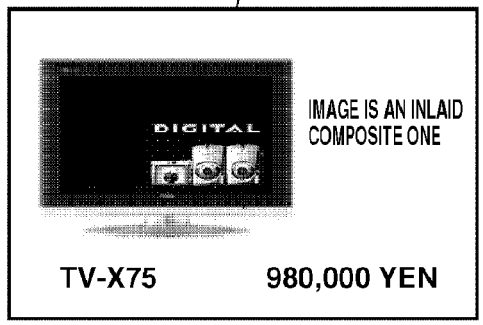
IMAGE IS AN INLAID COMPOSITE ONE
TV-X75　　　980,000 YEN
page 2
*603*
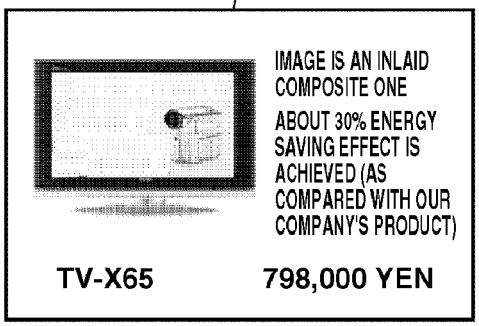
IMAGE IS AN INLAID COMPOSITE ONE
ABOUT 30% ENERGY SAVING EFFECT IS ACHIEVED (AS COMPARED WITH OUR COMPANY'S PRODUCT)
TV-X65　　　798,000 YEN
page 3
*611*　*604*
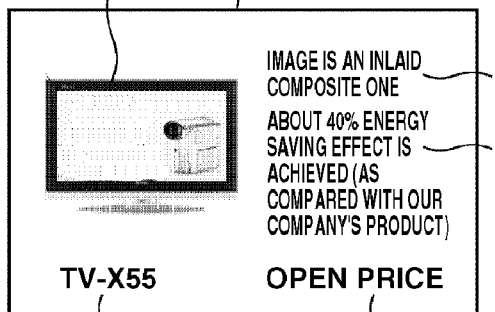
IMAGE IS AN INLAID COMPOSITE ONE　*614*
ABOUT 40% ENERGY SAVING EFFECT IS ACHIEVED (AS COMPARED WITH OUR COMPANY'S PRODUCT)　*615*
TV-X55　　　OPEN PRICE
*612*　page 4　*613*
*605*
| BACK COVER |
page 5

FIG.7
701
FRONT COVER
page 1
702
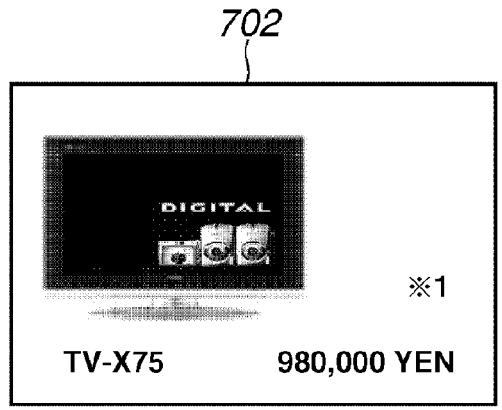
※1
TV-X75    980,000 YEN
page 2
703
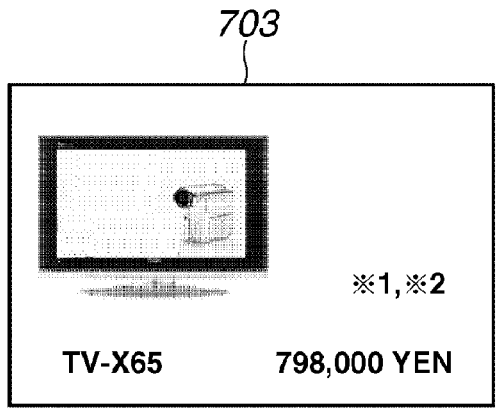
※1,※2
TV-X65    798,000 YEN
page 3
704
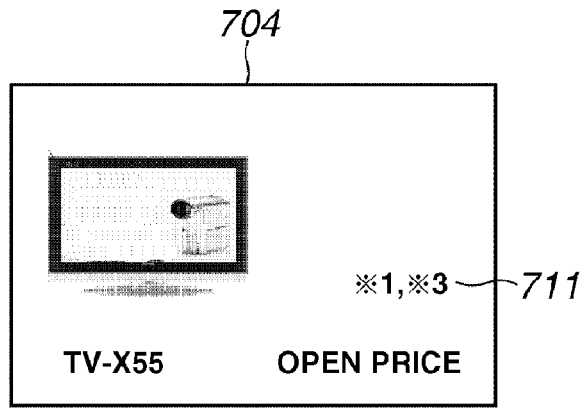
※1,※3 —711
TV-X55    OPEN PRICE
page 4
705  712  713
※1 IMAGES ARE INLAID COMPOSITE ONES
※2 ABOUT 30% ENERGY SAVING EFFECT
IS ACHIEVED (AS COMPARED WITH
OUR COMPANY'S PRODUCT)
※3 ABOUT 40% ENERGY SAVING EFFECT
IS ACHIEVED (AS COMPARED WITH
OUR COMPANY'S PRODUCT)
page 5
706
BACK COVER
page 6

FIG.11

| 1101 | 1102 | 1103 | 1104 | 1105 |
|---|---|---|---|---|
| NAME | PRICE | IMAGE | ANNOTATION 1 (MERGE TARGET) | ANNOTATION 2 (MERGE TARGET) |
| iRC5800 | 2,250,000 YEN | C:¥......¥iR5570.jpg | COLOR MODEL | |
| iR5570 | 2,080,000 YEN | C:¥......¥iR5570.jpg | MONOCHROME MODEL | |
| iR4570 | 1,280,000 YEN | C:¥......¥iR4570.jpg | MONOCHROME MODEL | |
| iRC3220 | 1,590,000 YEN | C:¥......¥iRC3220.jpg | COLOR MODEL | |
| iR2270 | 880,000 YEN | C:¥......¥iR5570.jpg | MONOCHROME MODEL | |
| iR3310F-R | OPEN PRICE | C:¥......¥iR3310F-R.jpg | MONOCHROME MODEL | ENVIRONMENT-CONSCIOUS PRODUCT |

FIG.13
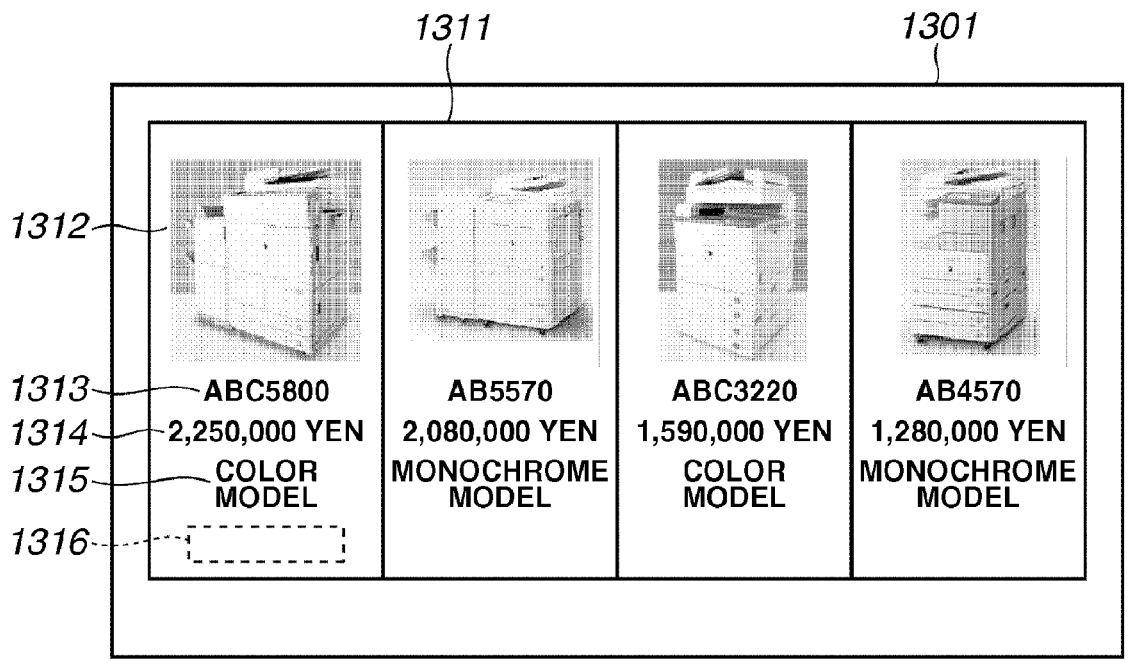
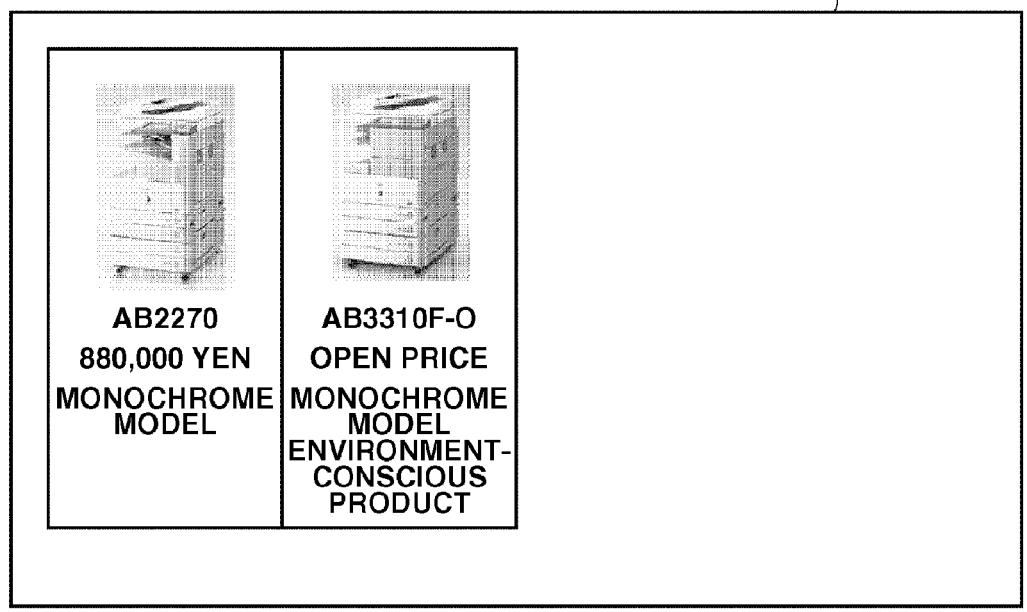

FIG.14
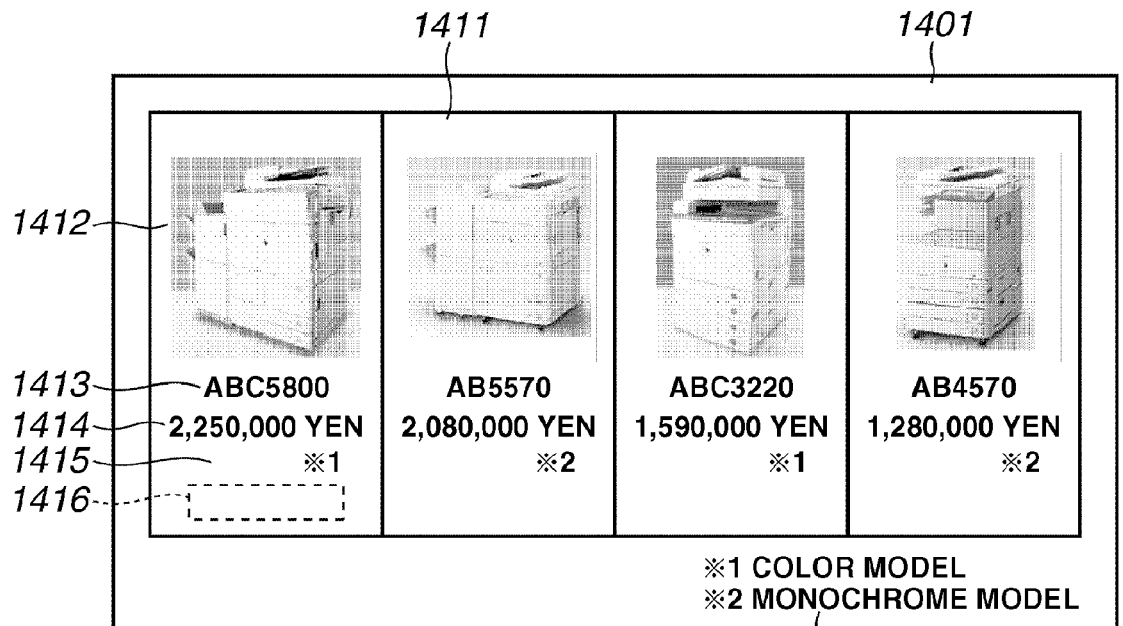
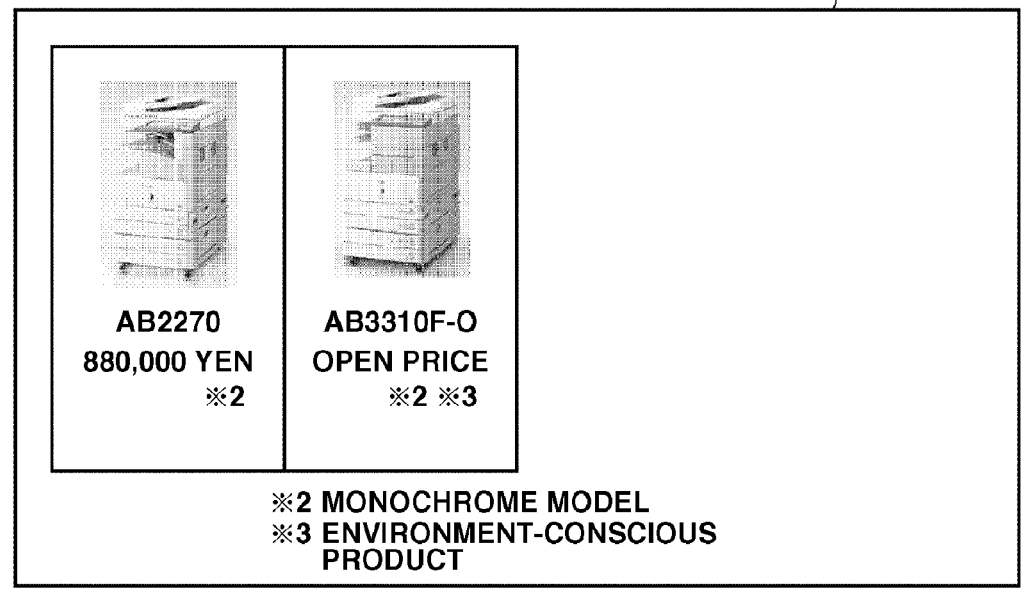

FORM OUTPUT CONTROL APPARATUS, FORM OUTPUT CONTROL METHOD, AND COMPUTER READABLE PROGRAM

BACKGROUND OF THE INVENTION

1. Field of the Invention

The present invention relates to a form output control apparatus, a form output control method, and a computer readable program.

2. Description of the Related Art

Computerization of documents, popularization of networks, and dramatic increase in capacity of storage devices have progressed. Documents can be collectively managed on a server and accessed by a plurality of users. Also, sharing and centralization of information have progressed. What is called a "one-source multi-use" strategy for processing and utilizing information managed by a server or the like in various situations has become widespread.

Against this background, Japanese Patent Application Laid-Open No. 2006-24021 discusses a form output function of automatically creating a format, a catalog, and presentation data by inserting a plurality of pieces of different data managed in common, into a common template.

However, according to the conventional form output function, data is automatically applied to a prepared template. Thus, redundant output results are frequently produced. For example, generally, in trade catalogs, to strongly attract attention to products themselves, only annotation symbols are added to descriptions of each trade product as to less important annotations, and annotations and additional information are collectively indicated in a section other than such descriptions. However, in a case where catalogs are created by performing the form output function, annotations and additional information are output corresponding to each product, because the annotations and the additional information are related to the products. Consequently, less important information is repeatedly indicated.

Accordingly, the form output function has a drawback in that because it is necessary to manually correct automatically output results in certain instances, advantages of variable data outputting (also referred to simply as variable outputting) may not be optimally utilized.

SUMMARY OF THE INVENTION

An embodiment of the present invention is directed to enhancement of ability to attract attention to an output article by collectively outputting annotation data of each record when outputting contents data which represents contents placed in a template.

According to an aspect of the present invention, an apparatus configured to place contents data of a plural records of a database in a template represented by template data and to output the template data in which the contents data are placed. The apparatus includes a storage unit configured to store the template data defining a field area in which the contents data are placed, a setting unit configured to set replacement information for replacing annotation information placed in the template represented by the template data, and a replacement unit configured to replace, when the contents data of the plural records is placed in the field area defined by the template data, the annotation information of each record with the replacement information set by the setting unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates a "table 1" of a database that stores data to be output according to an exemplary embodiment of the present invention.

FIG. 5 illustrates template data to be used when information illustrated in FIG. 4 is output in an exemplary embodiment of the invention.

FIG. 6 illustrates an example of a result of outputting the information illustrated in FIG. 4 according to the template illustrated in FIG. 5.

FIG. 7 illustrates an example of outputting an annotation merged with an ordinary form output illustrated in FIG. 6.

FIG. 11 illustrates a "table 2" of the database that stores data to be output according to an exemplary embodiment of the present invention.

FIG. 13 illustrates an example of outputting the information illustrated in FIG. 11 according to the template data illustrated in FIG. 12 by a form output processing submodule 302-3 without performing an annotation merge.

FIG. 14 illustrates an example in which the form output processing submodule 302-3 outputs data illustrated in FIG. 11 according to the template data illustrated in FIG. 15 by performing an annotation merge.

DETAILED DESCRIPTION OF THE EMBODIMENTS

Various exemplary embodiments, features, and aspects of the invention will be described in detail below with reference to the accompanying drawings.

Figure 1:
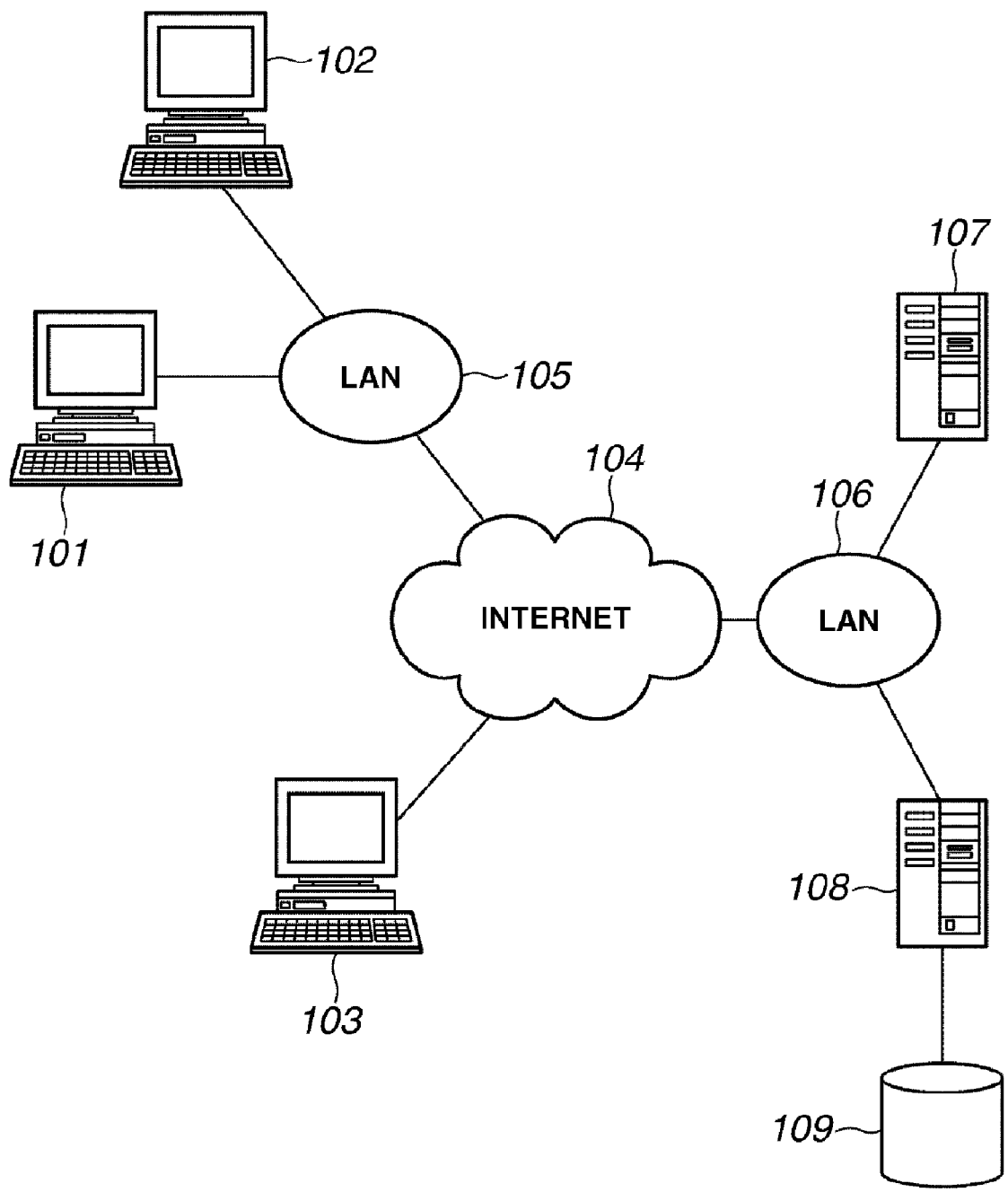
FIG. 1 is a schematic diagram illustrating a configuration of a network system according to an exemplary embodiment of the present invention.

FIG. 1 is a schematic diagram illustrating the configuration of a network system according to an exemplary embodiment of the present invention. As shown in FIG. 1, the network system has local area networks (LANs) 105 and 106, and the Internet 104. The network system includes client personal computers (hereunder referred to as client PCs) 101 and 102 connected to the LAN 105, a hypertext transfer protocol (HTTP) server 107 connected to the LAN 106, and a Web application server 108. The network system further includes a client PC 103 directly connected to the Internet 104.

The client PCs 101, 102, and 103 are used to register new data files on the Web application server 108, and to search for and refer to the data files. The data files correspond to contents data serving as variable data for use in variable-data-printing (i.e., variable printing).

The HTTP server 107 receives requests transmitted from the client PCs 101, 102, and 103 through the LAN 105, the Internet 104 and the LAN 106. When receiving the requests transferred by the HTTP server 107 which has received the requests from the client PC, the Web application server 108 performs processing according to the requests and sends back results of the processing to the client PCs 101, 102, and 103.

A database 109 is connected to the Web application server 108 which stores electronic data received from the client PC and the like.

A combination of the HTTP server 107, the Web application server 108, and the database 109 can function as a Web database system. The network system according to the present invention is not limited to that illustrated in FIG. 1. The client PC 101 and the Web application server 108 can be connected to each other through the LAN 106.

Figure 2:
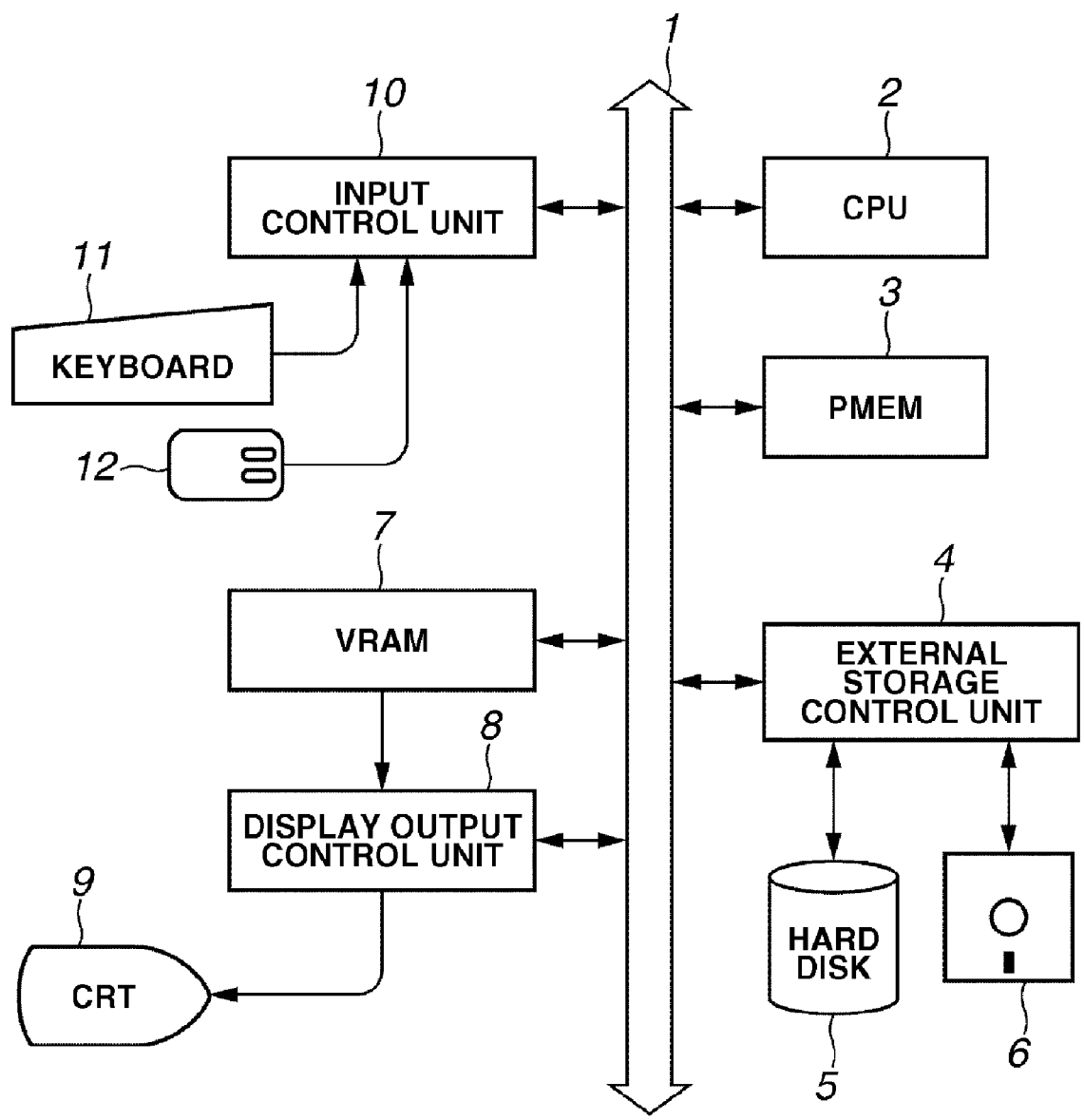
FIG. 2 is a block diagram illustrating a configuration of a Web application server 108 serving as an apparatus configured to manage an operation history function according to an exemplary embodiment of the present invention.

FIG. 2 is a block diagram illustrating a configuration of the Web application server 108 serving as an apparatus configured to manage an operation history function according to an exemplary embodiment of the present invention. As shown in FIG. 2, the Web application server 108 includes a system bus 1, a central processing unit (CPU) 2, a program memory 3, an external storage control unit 4, an input control unit 10, a keyboard 11, a pointing device 12, a video image memory 7, and a display output control unit 8. The Web application server 108 further includes a CRT display unit 9. Hereunder, the program memory is abbreviated as "PMEM". Also, the video image memory 7 is abbreviated as "VRAM". The CRT display unit is abbreviated as "CRT".

Each of the composing elements is connected to the system bus 1. The CPU 2 is a central processing unit which controls each of the composing elements through the system bus 1 and which performs processing according to a control program stored in a read-only memory (ROM) (not shown). The PMEM 3 is used for appropriately selecting and reading from the ROM a control program for performing conditional branching. Data input from a keyboard 11 is stored as code information in the PMEM 3 also serving as a text memory.

The external storage control unit 4 controls writing and reading data to and from external storage units (a hard disk and a floppy disk in the present exemplary embodiment). A hard disk (HD) 5 and a floppy disk (FD) 6 are external storage units for storing data files.

Input units, such as the keyboard 11 and the pointing device 12, are connected to the input control unit 10. A user operates the keyboard 11 to issue an operation instruction to the system. Also, a user operates the pointing device 12 to issue an instruction on a screen of the CRT 9 to cause the system to process image information. In an embodiment, a mouse 12 is used as the pointing device 12.

An operator moves a cursor on the screen of the CRT 9 optionally in X-direction and/or Y-direction by using the mouse 12. Then, the operator selects a command icon on a command menu to designate processing to be performed. Additionally, the user designates an object to edit, and a position at which an image is drawn.

The VRAM 7 is a memory in which character data and graphic data displayed on the screen of the CRT 9 are developed as bitmap data. The display output control unit 8 controls displaying of data on the screen of the CRT 9. The CRT 9 is a display unit which displays an image shown in FIG. 11, which will be described later. The type of the display unit according to the present invention is not limited to a CRT type. A liquid crystal display type can also be employed.

An exemplary embodiment is configured so that a process definition module is stored in the ROM (not shown). However, the process definition module can be stored in the HD 5, the FD 6, or another unit connected to the network. The WEB application server 108 can supply the process definition module to another system or apparatus through storage media or networks.

Figure 3:
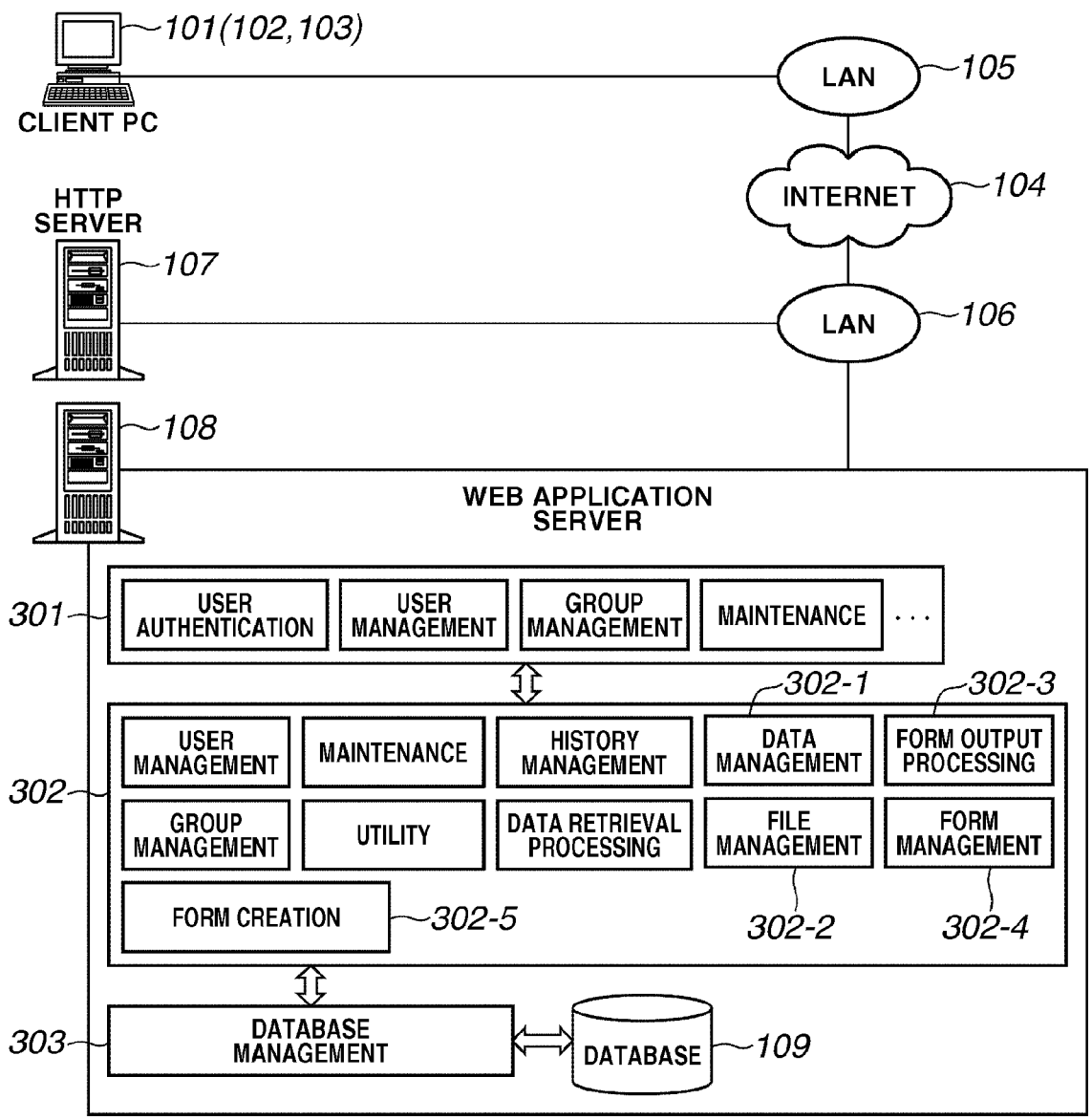
FIG. 3 is a block diagram illustrating a configuration of modules of the Web application server 108 according to an exemplary embodiment of the present invention.

FIG. 3 is a block diagram illustrating a configuration of modules of the Web application server 108, which are suitable for the form output control apparatus according to an exemplary embodiment of the present invention.

As illustrated in FIG. 3, the client PCs 101, 102, and 103 access the Web application server 108 using Web browsers that operate in these PCs. The Web application server 108 includes a request processing module 301, an edit module 302, a database management module 303, and a database 109.

The HTTP server 107 transfers requests received from the client PCs 101, 102, and 106 to the Web application server 108.

The request processing module 301 processes the requests, which are issued from the client PC and are transferred from the HTTP server 107, in the Web application server 108. The request processing module 307 has a request processing function for accessing each of function submodules of the edit module 302, in addition to a function of performing user authentication. The edit module 302 includes the function submodules, i.e., a user management submodule, a group management submodule, a data management submodule 302-1, a file management submodule 302-2, a data retrieval submodule, a history management submodule, a utility submodule, a form output processing submodule 302-3, a form management submodule 302-4, and a form creation submodule 302-5.

The data management submodule 302-1 cooperates with the file management submodule 302-2 and links data with files. The form output processing submodule 302-3 applies data or files to a form managed by the form management submodule 302-4 and outputs the form. The form creation submodule 302-5 is a processing unit adapted to create template data (corresponding to a form), which will be described by referring to FIG. 5. The form creation submodule 302-5 has functions of defining data fields in the template and also defining location attributes of each data field. The form creation submodule 302-5 has another function of setting an example of an annotation output, which will be described later, and another function of defining a position, at which an additional page newly added by replacing annotation information with this annotation output is inserted, in a template represented by the template data.

The database management module 303 manages an access between the edit module 302 and the database 109. The request processing module 301, the edit module 302, and the database management module 303 are loaded onto the memory of the Web application server 108 in response to a request from the client PC. Thus, associated processing is performed.

Next, a form output performed by the form output processing submodule 302-3 of the Web application server 108 serving as the form output control apparatus according to the present invention is described by referring to FIGS. 4, 5, and 6.

FIG. 4 illustrates a "table 1" of the database 109 that stores contents data of a plurality of lines (referred to as record lines) to be output according to an exemplary embodiment of the present invention. As illustrated in FIG. 4, the columns of this table, which manages the contents data, represent contents items. In an example illustrated in FIG. 4, this table includes a name column 401, a price column 402, an image column (corresponding to an file path to an image file) 403, a first annotation (Annotation 1) column 404, and a second annotation (Annotation 2) column 405. In the first annotation column 404, and the second annotation column 405, attributes for merge (or replacement) of an annotation are set. This database (or table) has record lines 411, 412, and 413. A user designates the record lines 411, 412, and 413 as output targets by performing a data retrieval/extraction operation, and a selection operation. Although FIG. 4 illustrates only output information as one table, for convenience of description, the output information can be present in another database or table. Additionally, information, which is not output, can be included in a table.

FIG. 5 illustrates template data to be used when contents data of each of the records illustrated in FIG. 4 is output by performing variable data outputting in an exemplary embodiment of the invention. This template data is stored in the form management unit (or storage unit) 302-4. A front cover template 501 is a template for a front cover. A back cover template 503 is a template for a back cover. A data output template 502 is an output template into which contents data is overlaid. The data output template 502 has a data field area in which contents data is placed. The data output template is repeatedly used the number of times which is equal to the number of records to be output. One of three attributes, i.e., an image field attribute, a text field attribute, and an annotation field attribute is set in the data field area. An image field 511 is a field area, in which image data is placed, and is associated with the database as an area to which an image related to data corresponding to a file path column 403 is output. A text field is a field in which a character string is placed. A name field 512, which is a text field, is associated with the database as an area to which each data of the name column 401 illustrated in FIG. 4 is output. An annotation-1 field 514 is associated with the database as an area to which each data of the annotation-1 column 404 illustrated in FIG. 4 is output. An annotation-2 field 515 is associated with the database as an area to which each data of the annotation-2 column 405 illustrated in FIG. 4 is output.

FIG. 6 illustrates an example of a result of variable-data-outputting of data synthesized from the contents data of three records 411, 412, and 413 illustrated in FIG. 4 by the form output processing submodule 302-3 of the Web application server 108 according to the template illustrated in FIG. 5. Data representing the front cover template 501 illustrated in FIG. 5 is output to a front cover 601. Data representing the back cover template 503 illustrated in FIG. 5 is output to a back cover 605. Data of the record lines 411, 412, and 413 illustrated in FIG. 4 are inserted into the data output template 502 and are then output to data output pages 602, 603, and 604, respectively.

An image 611 on the output page 604 is related to the data corresponding to the record line 413 and the file path column 403 and is output by being inserted into the image field 511. Data 612 corresponds to the name column 401 and to the record line 413 and is output by being inserted into the name field 512. Data 613 corresponds to the price column 402 and to the record line 413 and is output by being inserted into the price field 513. Data 614 corresponds to the annotation-1 column 404 and to the record line 413 and is output by being inserted into the annotation-1 field 514. Data 615 corresponds to the annotation-2 column 405 and to the record line 413 and is output by being inserted into the annotation-2 field 515. Similar to the output page 604, data corresponding to the record line 411 is inserted into the page 602, while data corresponding to the record line 412 is inserted into the page 603.

The location attribute of contents data to be placed in each data field of the template represented by the template data illustrated in FIG. 5 is defined in the associated data field. For example, in the image field, it is defined that an image represented by image data is automatically scaled by simultaneously maintaining an aspect ratio of the image represented by the image data so that the scaled image is fit into an associated field area. Also, in each text field, a font size, a character pitch, a font type, and a color used to display characters represented in the text data to placed (i.e., contents data) are defined. In a case where contents data is placed in a field area, the contents data is converted and processed according to the location attribute defined in the field area. Thus, the output page 604 is generated. The technique of defining the location attribute when the contents data is placed in the field areas has been known. Therefore, more specific description of the technique is omitted herein.

Next, an annotation merge pattern 1 (hereunder sometimes referred to simply as "merge pattern 1") corresponding to processing performed by the form output processing submodule 302-3 is described below by referring to FIGS. 7, 8, 9, and 10. The merge pattern (e.g., merge pattern 1) defines a manner of outputting annotation data which should not be repeatedly placed in all records corresponding to a given field area. The merge pattern is referred to also as an annotation output method (or an annotation output type). In the present exemplary embodiment, converting and outputting annotation data according to the merge pattern is referred to as a merge or replacement.

FIG. 7 illustrates an example of outputting an annotation merged with an ordinary form output illustrated in FIG. 6. A front cover 701 and a back cover 706 are the same as the front cover 601 and the back cover 605, respectively. Data output pages 702, 703, and 704 are the same as the data output pages 602, 603, and 604 illustrated in FIG. 6, respectively, except for the annotation-1 field and the annotation-2 field which are merge targets. Annotations and additional information are collectively output to a page 705. Although the page 705 is inserted in front of the back cover in the example illustrated in FIG. 7, an insertion position, at which the page 705 is inserted, is defined in the template data by the form creation submodule 302-5, as above-described.

Information 711 is displayed by replacing annotations represented by annotation-1 information and annotation-2 information with annotation symbols, respectively. The annotation-1 field and the annotation-2 field are merge targets and are associated with the annotation 1 and the annotation 2, respectively. The annotation symbols respectively corresponding to the annotation 1 and the annotation 2 are put into the annotation-2 field and are then output.

Annotation-1 information 712 includes an annotation symbol corresponding to the annotation 1 and contents of the annotation 1. Annotation-2 information 713 includes an annotation symbol corresponding to the annotation 2 and contents of the annotation 2.

Figure 8:
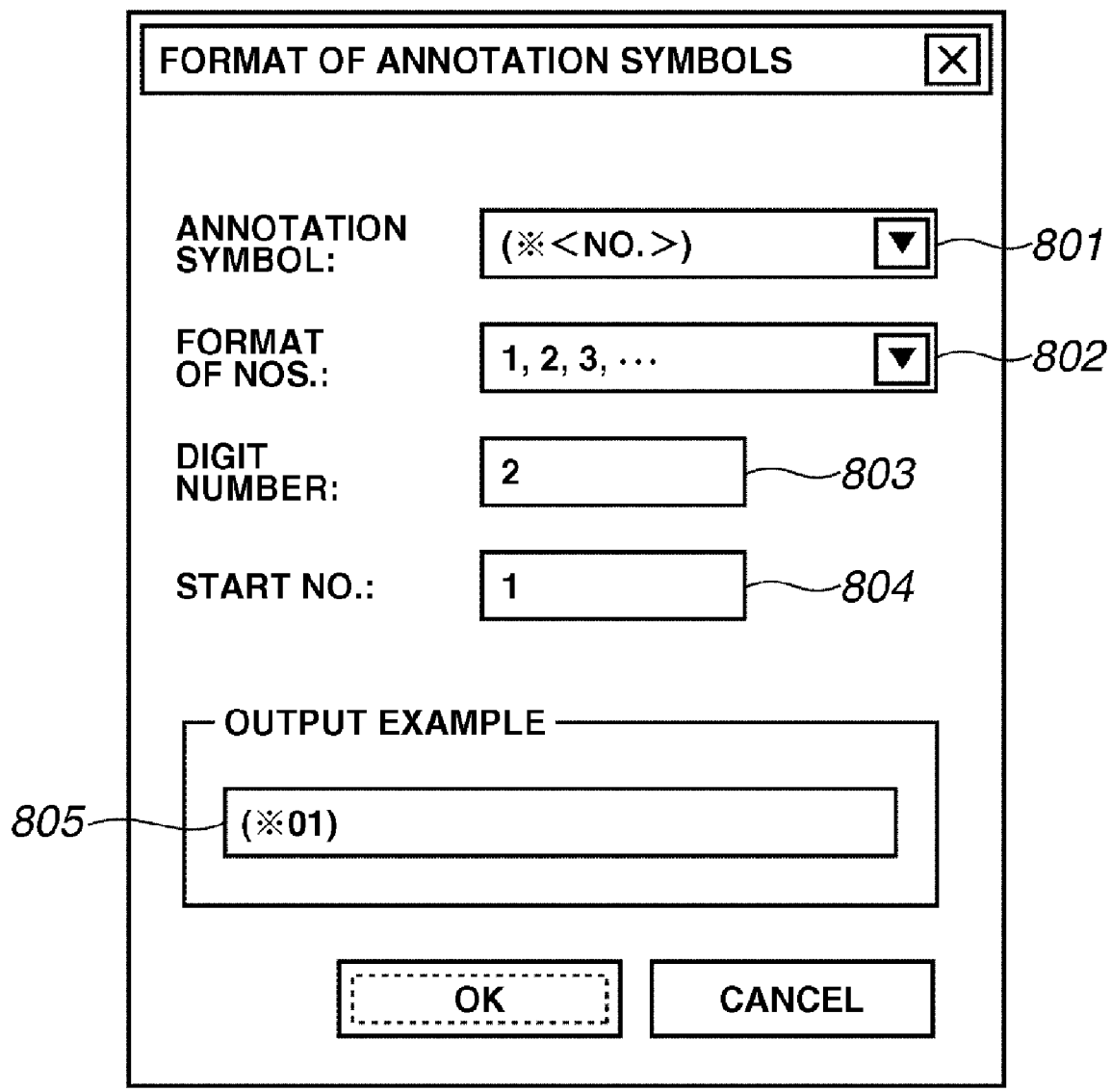
FIG. 8 illustrates a method of setting an annotation symbol based on a character according to an exemplary embodiment of the present invention.
Figure 9:
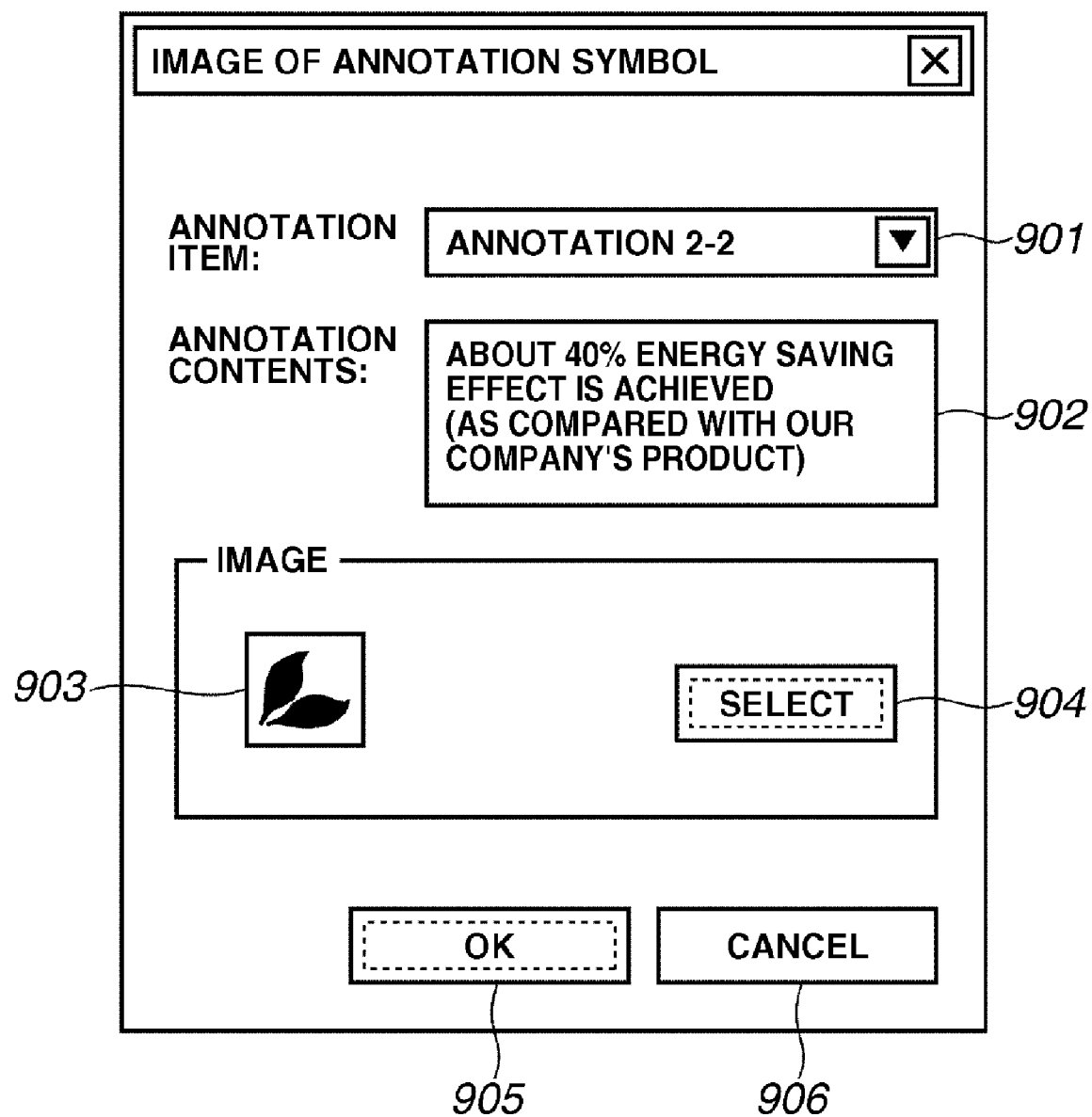
FIG. 9 illustrates a method of setting an annotation symbol based on an icon according to an exemplary embodiment of the present invention.

FIGS. 8 and 9 illustrate examples of a window which is a setting dialog window provided by the form creation submodule 302-5 and is used by a user to input data for setting a format of the annotation symbol. There are two kinds of the annotation symbols to be replaced with annotation data corresponding to contents data, that is, the annotation symbols based on characters and the annotation symbols based on icons. FIG. 8 illustrates a method of setting an annotation symbol based on a character. On the other hand, FIG. 9 illustrates a method of setting an annotation symbol based on an icon.

A list box 801 illustrated in FIG. 8 is used to select a format of an annotation symbol. A list box 802 represents a format of a number. An edit box 803 indicates a number of digits. An edit box 804 indicates a start number. An output example 805 is an image of an annotation symbol created as a result of setting the list boxes 801 and 802 and the edit boxes 803 and 804 by an operator. That is, the output example 805 indicates how annotation data is replaced with an annotation symbol. According to the annotation symbols based on characters, numbers are sequentially assigned to pieces of annotation information, which are merge targets.

In the case of the annotation symbols based on characters, a format of each annotation is specified. In contrast, in the case of the annotation symbols based on icons, an icon is specified for each annotation. A list box 901 illustrated in FIG. 9 is used to select annotation information to which an annotation symbol is assigned. Information to be displayed as an option corresponds to the annotation 1 or the annotation 2 included in the database (or table) illustrated in FIG. 4. In a case where there is a plurality of comments on the annotation-1 column, the Web application server 108 classifies the comments into each kind which is represented by a hyphen and numerals.

The edit box 902 represents the contents of the annotation item selected in the list box 901. An image 903 is an image of a selected icon. An operator pushes a selection button 904 to select an image file corresponding to an icon. When the image file is selected, the image 903 of the selected icon is displayed. When an operator pushes an OK button 905, association between an annotation and an icon corresponding to an annotation symbol is definitely determined. When a user pushes a cancel button 906, the association between the annotation and the annotation symbol icon is not set.

Thus, information replaced with the annotation data can be defined by different functions corresponding to the records, respectively, as shown in the output example 805. Alternatively, as the output example 903, the information replaced with the annotation data can be defined by fixed information (representing an image or a figure) corresponding to an annotation item 901.

Figure 10:
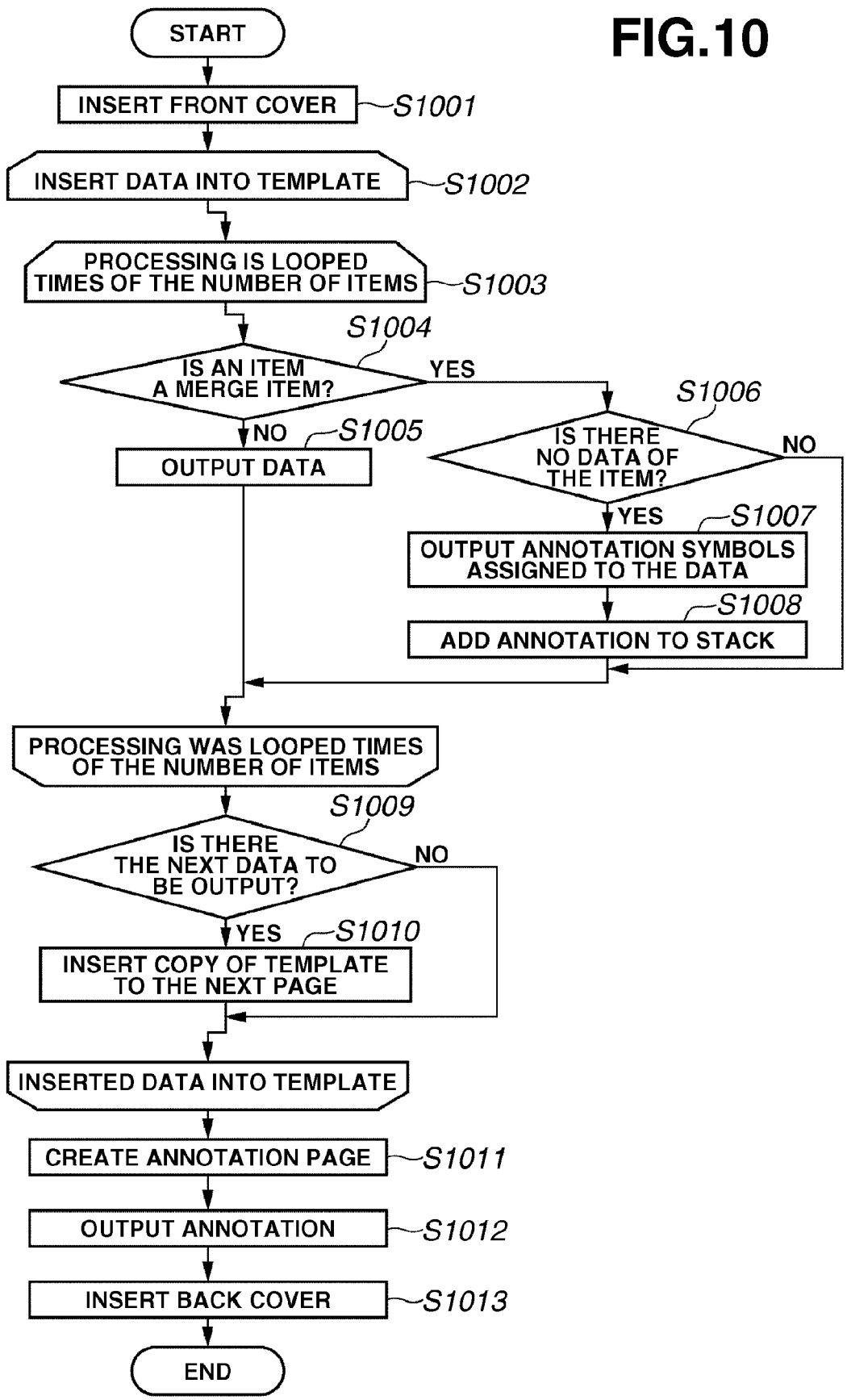
FIG. 10 is a flowchart illustrating a process according to an "annotation merge pattern 1" in an exemplary embodiment of the present invention.

FIG. 10 is a flowchart illustrating control procedure followed by each of the processing submodules of the edit module 302 when form output processing including processing according to an "annotation merge pattern 1" is performed in an exemplary embodiment of the present invention. A user selects data to be output by using the data retrieval function from the client PC 101 (or 102, or 103). Also, the user designates a template. Then, the user makes an output request to the Web application server 108. In the Web application server 108, the request processing module 301 receives an output request. Then, the request processing module 301 acquires data from the data management submodule 302-1 and also acquires a template from the form management submodule 302-4. Subsequently, the request processing module 301 issues an output request to the form output processing submodule 302-3.

The form output processing submodule 302-3 first creates a front cover using the front cover template 501 in step S1001. Subsequently, the form output processing submodule 302-3 uses the data output template 502 and inserts data into the template to create a page in step S1002. In a case where there is a plurality of data in loop processing, the form output processing submodule 302-3 makes copies of the data output template 502 the number of times equal to that of the data. The form output processing submodule 302-3 performs insertion processing on data the number of times equal to that of the items in step S1003.

For example, in the example illustrated in FIG. 4, the items are the name, the price, the image, the annotation 1, and the annotation 2. When inserting the data, the form output processing submodule 302-3 first refers to the merge target attribute and determines in step S1004 whether the current item is a merge item. If the current item is not a merge item (No in step S1004), the form output processing module 302-3 performs output processing to output the data directly to the template in step S1005. If the current item is a merge item (Yes in step S1004), the form output processing submodule 302-3 determines in step S1006 if there is data associated with the current item.

If there is no data (No in step S1006), it is unnecessary to output data. Thus, the form output processing submodule 302-3 does not perform output processing. Conversely, if there is data (Yes in step S1006), the form output processing submodule 302-3 outputs to the template the annotation symbol assigned to the data of this merge item in step S1007.

The form output processing submodule 302-3 adds the data, which is to be output, to a stack in step S1008 to output the data later. This stack is classified according to the data of the merge items. Data of the same item are merged. After the data is output, the form output processing submodule 302-3 determines in step S1009 whether the next output data is present.

If the next output data is present (Yes in step S1009), the form output processing submodule 302-3 inserts a copy of the data output template 502 into the next page in step S1010. If all data are output (No in step S1009), the form output processing submodule 302-3 inserts a page for outputting data of an omitted merge item in step S1011. Subsequently, the form output processing submodule 302-3 outputs the data, such as an annotation, of the merge item having been stored in the stack instep S1012. Then, the form output processing submodule 302-3 creates a back cover using the back cover template 503. Further, the form output processing submodule 302-3 finishes the processing illustrated in FIG. 10.

Next, an annotation merge pattern, that is, the merge pattern 2 corresponding to the processing performed by the form output processing submodule 302-3 is described below by referring to FIGS. 11, 12, 13, 14, 15, and 16.

FIG. 11 illustrates a "table 2" of the database that stores contents data to be output by performing the variable data outputting. As illustrated in FIG. 11, the table includes a name column 1101, a price column 1102, an image column (corresponding to a file path to an image file) 1103, a first annotation (i.e., annotation-1) column 1104, and a second annotation (i.e., annotation-2) column 1105, as data item columns. An annotation merge attribute is set in the annotation-2 column 1105. Although FIG. 11 illustrates only output information as one table, for convenience of description, the output information can be present in another database or table. Additionally, information, which is not output, can be included in a table.

Figure 12:
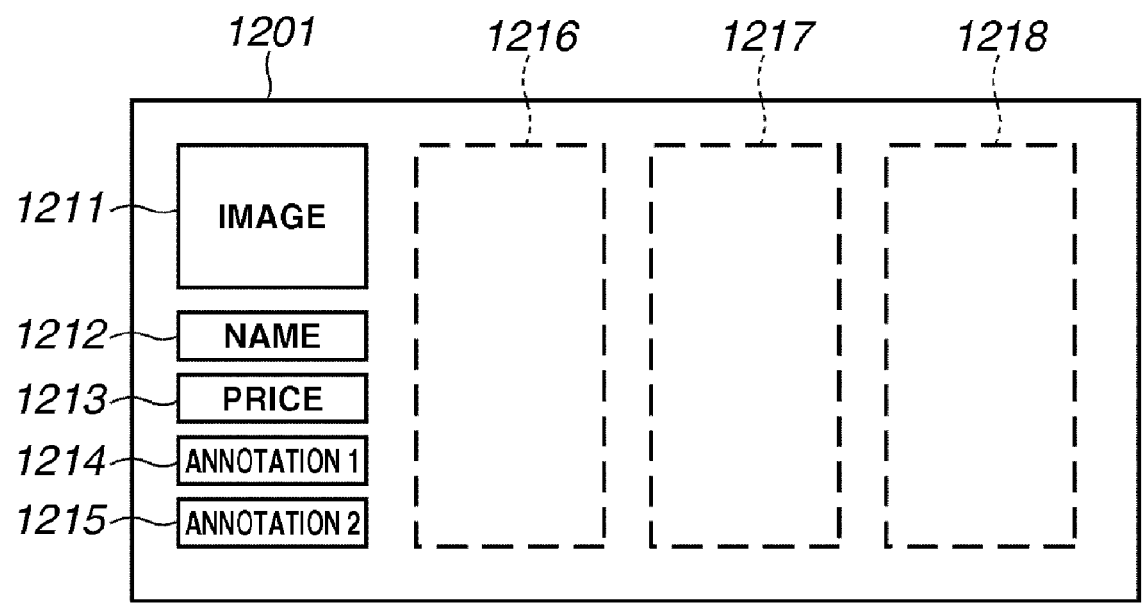
FIG. 12 illustrates template data to be used when information illustrated in FIG. 11 is output in an exemplary embodiment of the invention.

FIG. 12 illustrates template data to be used for placing contents data of each of record lines shown in FIG. 11. A data output template 1201 is an output template of 1 page in which the contents data is placed. Although not prepared in an example illustrated in FIG. 12, a front cover and a back cover can be registered in the data output template 1201, similarly to the example illustrated in FIG. 5. An image field 1211 is an area to which an image related to each data of the file path column 1103 is output. A name field 1212 is an area to which each data of the name column 1101 is output. A price field 1213 is an area to which each data of the price column 1102 is output. An annotation-1 field 1214 is an area to which each data of the first annotation column 1104 is output. An annotation-2 field 1215 is an area to which each data of the second annotation column 1105 is output.

The data output template 1201 has four areas to which data is output. According to the number of data to be output, the fields or areas 1211, 1212, 1213, 1214, and 1215 are copied onto areas 1216, 1217, and 1218. In the example of the data output template 1201, it is set that three copies are made in the rightward direction. However, it may be set so that copies are made in the downward direction. Alternatively, it can also be set so that copies are made in the rightward direction and in the downward direction, as in a case of upper-and-lower-columns setting. When a current page is filled with the data, the form output processing module 302-3 inserts a copy of the data output template 1201 into the next page.

FIG. 13 illustrates an example of outputting the information illustrated in FIG. 11 according to the template data illustrated in FIG. 12 by the form output processing submodule 302-3 without performing an annotation merge. The data output template 1201 is set so that four pieces of data are output to 1 page. There are six pieces of data to be output, so that four pieces of data are output to "page 1" 1301, and that two pieces of data are output to "page 2" 1302.

A user can select whether data boundary lines 1311 are drawn. As shown in FIG. 13, image data 1312, name data 1313, price data 1314, annotation-1 data 1315, and annotation-2 data 1316 are displayed. However, because there is no data in the annotation-2 field 1316, the annotation 2 is not displayed.

Figure 15:
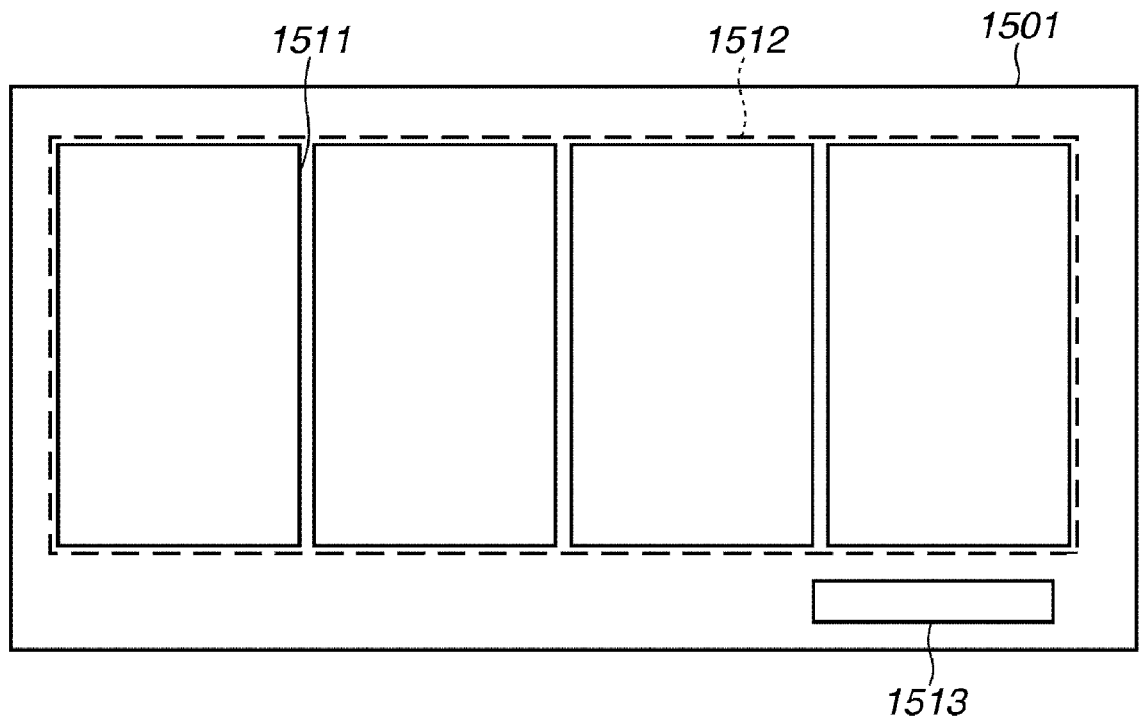
FIG. 15 illustrates a method of setting a position at which annotation contents are displayed.

FIG. 14 illustrates an example in which the form output processing submodule outputs the data illustrated in FIG. 11 according to the template data illustrated in FIG. 15, which represents a template obtained by improving the template illustrated in FIG. 12, to a "page 1" 1401 and a "page 2" 1402 by performing an annotation merge. The arrangement position of the data and the technique of creating pages are similar to those employed in the case illustrated in FIG. 13.

A user can select whether data boundary lines 1411 are drawn. As shown in FIG. 14, image data 1412, name data 1413, price data 1414, annotation-1 data 1415, and annotation-2 data 1416 are displayed. The "annotation 1" and the "annotation 2" are merge target items. The "annotation 2" is associated with the "annotation 1". Thus, the "annotation 1" and the "annotation 2" are replaced with the annotation symbols. Also, the annotation symbol corresponding to the "annotation 2" is described together with the annotation symbol corresponding to the "annotation 1" in an area corresponding to the annotation-1 field.

As defined in the template illustrated in FIG. 15, the annotations 1417 are merged on and are output to each page. There are "annotations 1 and 2" respectively corresponding to the annotation symbols *1 and *2 on "page 1" 1401. Thus, contents 1417 of both the "annotations 1 and 2" respectively corresponding to the annotation symbols *1 and *2 are output thereto. On the other hand, there are "annotations 2 and 3" respectively corresponding to the annotation symbols *2 and *3 on "page 1" 1402. Thus, contents of both the "annotations 2 and 3" respectively corresponding to the annotation symbols *2 and *3 are output thereto.

There are two methods of setting a position at which the contents of the annotation are displayed. That is, one of the methods is to set an absolute position. The other method is to set a relative position. The methods of setting a position, are described below with reference to FIG. 15.

FIG. 15 illustrates a template page 1501 to which contents data to be placed therein are output. Boundary lines 1511 surround an area in which the field areas 1211 to 1215 are defined, and into which contents data of 1 record is respectively overlaid, as shown in FIG. 12. Dashed lines 1512 surround an area having a plurality of overlaying-areas 1511. Dashed lines 1512 are illustrated, for convenience of description. However, the dashed lines 1512 are not actually displayed. A field 1513 is an annotation output field, in which the contents of the annotations having undergone the replacement processing in the overlaying-area is displayed, and is defined in a template page 1501. Dashed lines 1513 are illustrated, for convenience of description. However, the dashed lines 1513 are not actually displayed. The example of an output illustrated in FIG. 14 is obtained by performing variable data outputting according to this template page 1501. Next, the method of setting the absolute position, and that of setting the relative position are described below.

The method of setting the absolute position is to designate the position of the contents of the annotations on a page. For example, the absolute position is designated as follows:

(X-coordinate, Y-coordinate)

The method of setting the relative position is to designate the relative position determined with respect to a data group. The data group is a range surrounded by dashed lines 1512. That is, a position (i.e., a leftwardly upward position, an upward center position, a rightwardly upward position, a leftwardly downward position, a downward center position, and a rightwardly downward position etc.) of the annotation is set with respect to the dashed line 1512. Also, margins from the location of the annotation to the dashed lines 1512 are designated, for example, in the following manner: A rightwardly downward position, a top margin is 10 points, a rightward margin is 10 points.

Figure 16:
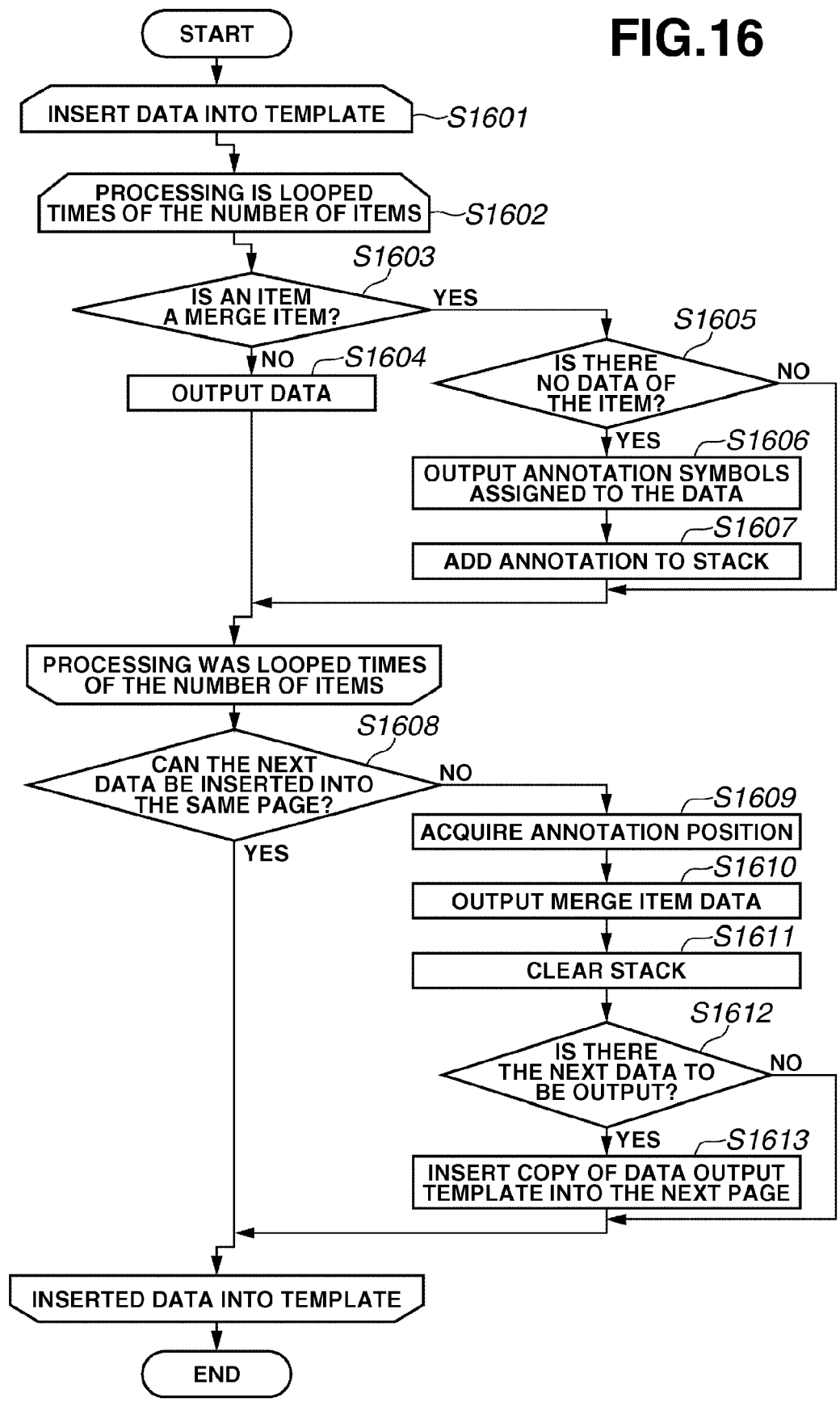
FIG. 16 is a flowchart illustrating a process according to an "annotation merge pattern 2" in an exemplary embodiment of the present invention.

FIG. 16 is a flowchart illustrating processing according to the "annotation merge pattern 2". A user selects data, which is to be output, from the client PC 101 (or 102 or 103) using the data retrieval function. The user designates a template and makes an output request to the Web application server 108. Then, in the Web application server 108, the request processing module 301 receives the output request. Subsequently, the request processing module 301 acquires data from the data management submodule 302-1 and also acquires the template from the form management submodule 302-4. Then, the request processing module 301 issues an output request to the form output processing submodule 302-3.

The form output processing submodule 302-3 first uses a data output template 1201 and inserts data into the template to create a page in step S1601. In a case where there is a plurality of data in loop processing, the form output processing submodule 302-3 makes copies of the data output template 1201 the number of times equal to that of the data. The form output processing submodule 302-3 performs insertion processing on data the number times equal to that of the items in step S1602.

For example, in the example illustrated in FIG. 11, the items are the name, the price, the image, the annotation 1, and the annotation 2. When inserting the data, the form output processing submodule 302-3 first refers to the merge target attribute and determines in step S1603 whether the current item is a merge item. If not a merge item (No in step S1603), the form output processing module 302-3 performs output processing to output the data directly to the template in step S1604. If the current item is the merge item (Yes in step S1603), the form output processing submodule 302-3 determines in step S1605 whether data is present.

If there is no data (No in step S1605), it is unnecessary to output data. Thus, the form output processing submodule 302-3 does no output processing. Conversely, if there is data (Yes in step S1605), the form output processing submodule 302-3 outputs to the template the annotation symbol assigned to the data of this merge item in step S1606.

The form output processing submodule 302-3 adds the data, which is to be output, to a stack in step S1607 to output the data later. This stack is classified according to the data of the merge items into kinds. Data of the same item are merged.

The form output processing submodule 302-3 determines in step S1608 whether any data to be inserted is still present, or whether the next data can be inserted into the same page. If data to be inserted is present, and this data can be inserted into the same page (Yes in step S1608), the form output processing submodule 302-3 proceeds to processing of the next data. If data to be inserted is absent, or if data to be inserted is present and this data cannot be inserted into the same page (No in step S1608), the form output processing submodule 302-3 performs the insertion of the annotation.

First, the form output processing module 302-3 acquires the position of the annotation in step S1609. Then, the form output processing submodule 302-3 outputs the merge item data, such as the annotation, stored in the stack in step S1610. Then, the form output processing submodule 302-3 clears the stack in step S1611. In step S1612, the form output processing submodule determines whether the next output data is present. If the next output data is present (Yes in step S1612), the form output processing submodule 302-3 inserts a copy of the data output template 1201 into the next page in step S1613.

Next, an annotation merge pattern, that is, the merge pattern 3 corresponding to the processing performed by the form output processing submodule 302-3 is described below by referring to FIGS. 17, and 18.

Figure 17:
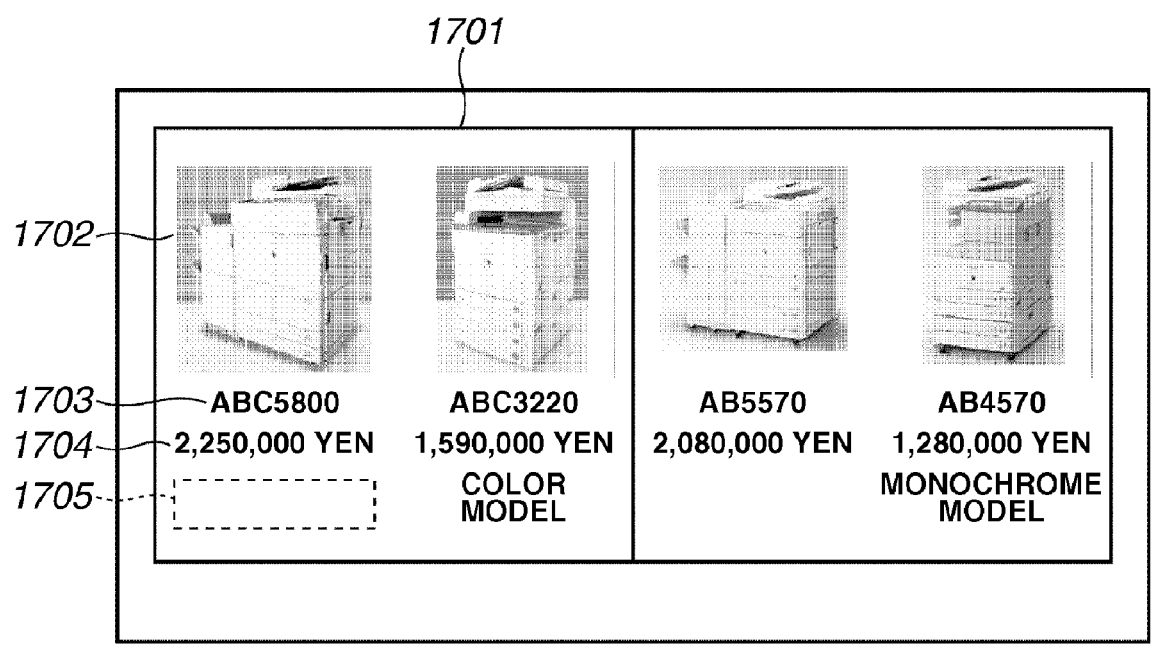
FIG. 17 illustrates an example in which the form output processing submodule 302-3 outputs the data by performing an annotation merge according to an "annotation merge pattern 3".

FIG. 17 illustrates an example in which the form output processing submodule 302-3 outputs the data by performing an annotation merge using the "annotation merge pattern 3". This example includes data boundary lines 1701, image fields 1702, name fields 1703, price fields 1704, and annotation fields 1705. According to the merge pattern 3, the form output processing submodule 302-3 sorts the data according to the contents of the annotations.

Additionally, the form output processing submodule 302-3 deletes the boundary line between the data having the same annotation data as to the data lines 1701. Also, it is indicated that pieces of data having the same annotation data are grouped. Regarding an output of the annotations, the form output processing submodule 302-3 outputs a specific annotation included in each group and inhibits an output of the other annotations.

Figure 18:
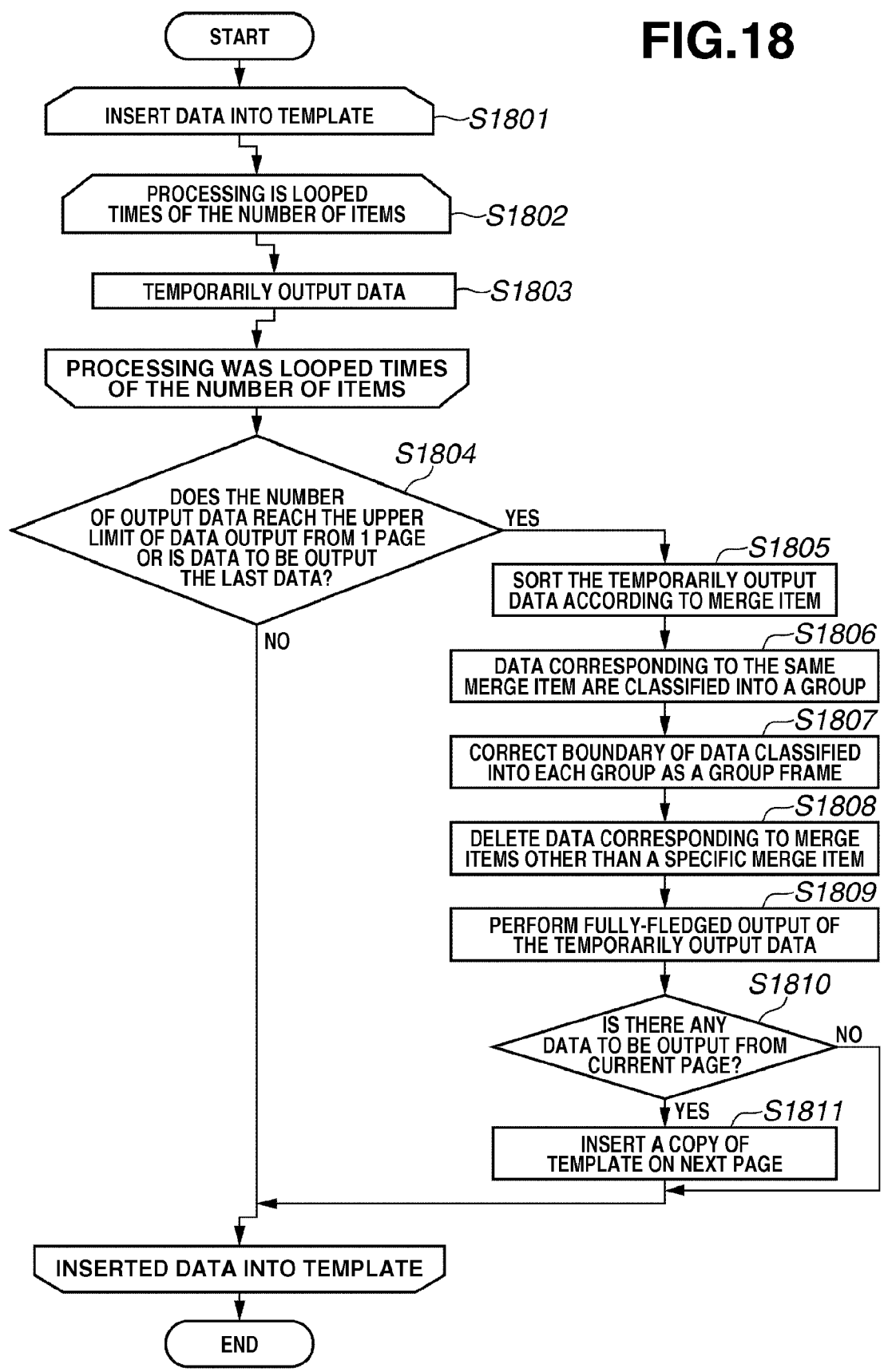
FIG. 18 is a flowchart illustrating a process according to an "annotation merge pattern 3" in an exemplary embodiment of the present invention.

FIG. 18 is a flowchart illustrating a process according to an "annotation merge pattern 3". A user selects data, which is to be output, from the client PC 101 (or 102 or 103) using the data retrieval function. The user designates a template and makes an output request to the Web application server 108. Then, in the Web application server 108, the request processing module 301 receives the output request. Subsequently, the request processing module 301 acquires data from the data management submodule 302-1 and also acquires the template from the form management submodule 302-4. Then, the request processing module 301 issues an output request to the form output processing submodule 302-3.

The form output processing submodule 302-3 first inserts data into a template in step S1801. Also, the form output processing submodule 302-3 loops processing on the data a number of times equal to the items in step S1802. Then, the form output processing submodule 302-3 performs temporary output processing in step S1803. According to the "annotation merge pattern 3", data is sorted in units of pages. Thus, the form output processing submodule 302-3 performs once temporary output of the data.

The form output processing submodule 302-3 determines in step S1804 whether the number of pieces of the output data reaches an upper limit of output data in one page, or whether current data to be output is the last data. If the number of pieces of the output data does not reach an upper limit of output data in one page, and the current data to be output is not the last data (No in step S1804), the form output processing submodule 302-3 continuously performs the temporary output processing on the data. If the number of pieces of the output data reaches an upper limit of output data in one page, or the current data to be output is the last data (Yes in step S1804), the form output processing submodule 302-3 sorts the temporarily output data according to the merge items in step S1805.

Subsequently, the form output processing module 302-3 groups the data corresponding to the same merge item in step S1806. Then, the form output processing module 302-3 corrects the grouped data by employing the boundary line as a group frame in step S1807. Then, the form output processing module 302-3 deletes the data other than those corresponding to a specific merge item in step S1808.

The form output processing module 302-3 performs a fully-fledged output of the temporarily output data in step S1809. Then, the output processing module 302-3 determines in step S1810 whether there is still data to be output. If data to be output is still present (Yes in step S1810), the form output processing module 302-3 inserts a copy of the template into the next page in step S1811.

Although the present exemplary embodiment provided with the three kinds of the merge patterns has been described, a user can select one of the merge patterns when the data is output. Next, the selection of the merge patterns is described with reference to FIG. 19.

Figure 19:
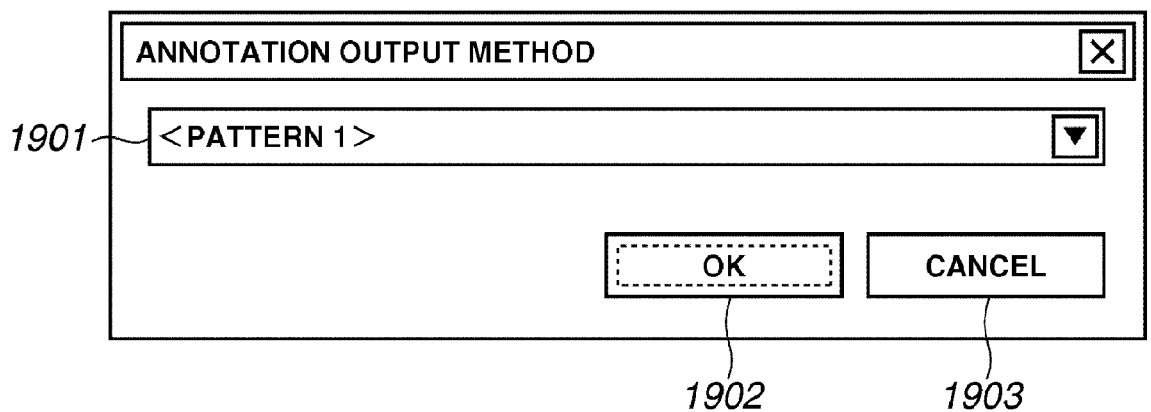
FIG. 19 illustrates a dialog box provided by a Web application server 108, from which a merge pattern is selected.

FIG. 19 illustrates a dialog box provided by the Web application server 108, from which a merge pattern is selected. A list box 1901 is used by a user to select a merge pattern. When an operator pushes an OK button 1902, a merge pattern to be used is determined. Further, when an operator pushes a cancel button 1903, the selection of the merge pattern is not performed. In a case where there is a limit to the output of the merge pattern, the Web application server 108 checks consistency of data to be output when the OK button 1902 is pushed by the operator.

The present invention can attract attention to an output article by collectively outputting annotation data of each record when outputting contents data placed in a template represented by template data.

Other Exemplary Embodiment

In the foregoing description of exemplary embodiments, the apparatus, in which the HTTP server 107 is provided separately from the Web application server 108, has been described. However, the apparatus according to the present invention is not limited thereto. The HTTP server 107 and the Web application server 108 can be configured integrally into a single unit.

Although the Web application server is provided in an above exemplary embodiment, a client server system can be employed in the apparatus according to the present invention.

Although an above exemplary embodiment utilizes the networks, such as the Internet 104, and the LANs 105 and 106, output processing can be performed on the client PC.

Thus, an above exemplary embodiment of the present invention can prevent output of less important information from being unnecessarily repeated as a result of automatic outputting. Consequently, a user is not required to manually correct an output result.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-174380 filed Jun. 23, 2006, which is hereby incorporated by reference herein in its entirety.

What is claimed is:

1. An apparatus having a processor and being configured to place contents data of plural records of a database in a template, the apparatus comprising:
    a storage unit configured to store the template on which the contents data are placed;
    a setting unit configured to set, via the processor, a replacement mark for replacing annotation information placed in the template;
    a replacement unit configured to replace, when the contents data of the plural records is placed in a field area defined by the template, the annotation information of each record with the replacement mark set by the setting unit; and
    a placing unit configured to place the replacement mark replaced by the replacement unit on a position for the annotation information on which the annotation information of each record is placed, and to place the annotation information of each record on a position different from the position for the annotation information.

2. The apparatus according to claim 1, wherein the template further defines an output method of outputting the replaced annotation information, and wherein the placing unit decides a position where the replaced annotation information is placed according to the defined output method.

3. The apparatus according to claim 2, wherein the replacement unit puts together the annotation information by inserting a page, on which the annotation information is placed, into pages of the template, in which the contents data is placed.

4. The apparatus according to claim 2, wherein the replacement unit puts together the annotation data in an annotation output field area defined in a page of the template, in which the contents data is placed.

5. The apparatus according to claim 1, further comprising a generating unit configured to generate a first group from a plurality of records including first annotation information and a second group from a plurality of records including second annotation information.

6. A method to place contents, which are represented by contents data of plural records of a database, in a template, the method comprising:
    setting a replacement mark for replacing annotation information representing an annotation to be placed in the template on which the contents data are placed;
    replacing, when the contents represented by the contents data of the plural records are placed in a field area defined by the template, the annotation information of each record with the set replacement mark; and
    placing the replacement mark on a position for the annotation information on which the annotation information of each record is placed, and placing the annotation information of each record on a position different from the position for the annotation information.

7. The method according to claim 6, wherein the template further defines an output method of outputting the replaced annotation information, and wherein the replaced annotation information is placed in a position decided according to the defined output method.

8. The method according to claim 7, wherein the replacing comprises:
    inserting a page, on which the annotation information is placed, into pages of the template.

9. The method according to claim 7, wherein the replacing comprises:
    placing the annotation information in an annotation output field area defined in a page of the template.

10. The method according to claim 6, further comprising generating a first group from a plurality of records including first annotation information and a second group from a plurality of records including second annotation information.

11. A computer-readable medium having stored thereon a computer program which when executed causes an apparatus to execute operations comprising:
    inserting data of a plurality of records in a template;
    setting a replacement mark for replacing annotation information to be inserted in the template on which the contents data are placed;
    replacing, when the contents represented by the contents data of the plural records are inserted in a field area defined by the template data, the annotation information of each record with the set replacement mark; and
    placing the replacement mark on a position for the annotation information on which the annotation information of each record is placed, and placing the annotation information of each record on a position different from the position for the annotation information.

12. The computer-readable medium according to claim 11, wherein the template further defines an output method of outputting the replaced annotation information, and wherein the replaced annotation information is placed in a position decided according to the defined output method.

13. The computer-readable medium according to claim 12, wherein the replacing comprises:
    inserting a page, in which the annotation information is inserted, into pages of the template.

14. The computer-readable medium according to claim 12, wherein the replacing comprises:
    inserting the annotation information in an annotation output field area defined in a page of the template.

15. The computer-readable medium according to claim 11, further comprising generating a first group from a plurality of records including first annotation information and a second group from a plurality of records including second annotation information.

* * * * *